US012404478B2

(12) United States Patent
Stenger

(10) Patent No.: US 12,404,478 B2
(45) Date of Patent: Sep. 2, 2025

(54) DETERGENT COMPOSITIONS

(71) Applicant: The Procter & Gamble Company, Cincinnati, OH (US)

(72) Inventor: Patrick Christopher Stenger, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 17/070,955

(22) Filed: Oct. 15, 2020

(65) Prior Publication Data

US 2021/0108159 A1 Apr. 15, 2021

Related U.S. Application Data

(60) Provisional application No. 62/915,211, filed on Oct. 15, 2019.

(51) Int. Cl.

| | |
|---|---|
| ***C11D 3/37*** | (2006.01) |
| ***C11D 1/22*** | (2006.01) |
| ***C11D 1/29*** | (2006.01) |
| ***C11D 1/75*** | (2006.01) |
| ***C11D 1/83*** | (2006.01) |
| ***C11D 3/00*** | (2006.01) |
| ***C11D 3/12*** | (2006.01) |
| ***C11D 3/22*** | (2006.01) |
| ***C11D 3/40*** | (2006.01) |
| ***C11D 3/50*** | (2006.01) |
| *C11D 1/72* | (2006.01) |

(52) U.S. Cl.

CPC .............. *C11D 3/3734* (2013.01); *C11D 1/83* (2013.01); *C11D 3/0026* (2013.01); *C11D 3/124* (2013.01); *C11D 3/222* (2013.01); *C11D 3/40* (2013.01); *C11D 3/505* (2013.01); *C11D 1/22* (2013.01); *C11D 1/29* (2013.01); *C11D 1/72* (2013.01); *C11D 1/75* (2013.01); *C11D 2111/12* (2024.01)

(58) Field of Classification Search

None

See application file for complete search history.

(56) References Cited

U.S. PATENT DOCUMENTS

| | | | | |
|---|---|---|---|---|
| 6,521,586 | B1 * | 2/2003 | Hoogland | C11D 3/373 516/120 |
| 2009/0229057 | A1 * | 9/2009 | Billiauw | C11D 11/0017 510/343 |
| 2011/0209291 | A1 | 9/2011 | Sadlowski et al. | |
| 2013/0276243 | A1 * | 10/2013 | Sadlowski | C11D 1/29 510/340 |
| 2014/0289969 | A1 * | 10/2014 | Sadlowski | C11D 1/29 510/343 |
| 2015/0210957 | A1 * | 7/2015 | Napolitano | C11D 17/0026 510/435 |
| 2016/0040101 | A1 | 2/2016 | De Poortere et al. | |
| 2016/0060574 | A1 | 3/2016 | Panandiker et al. | |
| 2016/0068784 | A1 * | 3/2016 | Vinson | C11D 1/37 510/357 |
| 2016/0340611 | A1 * | 11/2016 | Scheibel | C11D 1/22 |
| 2016/0340619 | A1 * | 11/2016 | Scheibel | C11D 1/22 |
| 2016/0340625 | A1 | 11/2016 | Scheibel et al. | |
| 2017/0015948 | A1 | 1/2017 | Johnson | |
| 2017/0253839 | A1 * | 9/2017 | Scheibel | C11D 1/12 |

FOREIGN PATENT DOCUMENTS

JP 2017529432 A 10/2017

OTHER PUBLICATIONS

15650M PCT Search Report and Written Opinion for PCT/US2020/055660 dated Mar. 1, 2021, 12 pages.

* cited by examiner

*Primary Examiner* — Lorna M Douyon

(74) *Attorney, Agent, or Firm* — Andrew J. Mueller

(57) ABSTRACT

An aqueous liquid detergent composition is disclosed. The aqueous liquid detergent composition having suds compatibility and improved cleaning. The composition has from about 1% to about 60%, by weight of the composition, from about 0.001% to about 4.0%, by weight of the composition, of an anti-foam selected from organomodified silicone polymers with aryl or alkylaryl substituents combined with silicone resin and a primary filler, which is modified silica, and from about 0.01% to about 2.5%, by weight of the composition, of a structurant, wherein the structurant is selected from: crystalline, hydroxyl-containing stabilizers, polymer gums, and mixtures thereof. The surfactant system includes linear alkylbenzene sulfonate and between 1% and 30% by weight of alkyl ethoxylated sulfate surfactant. The ratio of linear alkylbenzene sulfonate to alkyl ethoxylated sulfate surfactant is between 1.1:1 to 10:1.

14 Claims, No Drawings

DETERGENT COMPOSITIONS

FIELD OF THE INVENTION

The present invention relates to the field of liquid laundry detergent compositions containing AES surfactants and silicone suds suppressors. The present invention also relates to methods of using such compositions in treating textiles.

BACKGROUND OF THE INVENTION

Presently, the North American domestic laundry washing machine market (as well as to some extent, that of the global laundry market) is divided into two main types of washing machines: (1) "top-loading" or "vertical "axis" configuration and (2) the "front-loading", "high efficiency" ("HE") or "horizontal axis" washing machines. The horizontal axis washing machines have become increasingly more common in the North American market due in part to stricter energy and water consumption regulations which have increased the portion of new machines sold having the front-loading configuration. However, as the rate of washing machine replacement is typically very slow (many consumers wait until their old machine no longer functions to replace it), it is expected that the duality of machines will continue for quite some time.

Because of this duality of the washing machines used by North American consumers, particularly in the United States, but indeed to some extent, consumers globally, there is a consumer need for laundry detergents suitable for use in each type of machine. To a large extent, the domestic laundry detergents currently commercially available are formulated for one or the other type of machine, not both. This duality of product formulation is not without reason or consequence.

The reason for providing two types of detergents is often due to manufacturer's attempts to provide the in-wash suds profile that is consumer expected while still ensuring that the detergent will properly function with each type of machine. While it may seem strange, consumers have come to associate suds with cleaning and therefore laundry detergent manufacturers must ensure the right amount of suds during the wash cycle is observed to meet consumer's expectations. If the incorrect level of suds is created, the consumer may altogether stop using a detergent, even if it provides the appropriate cleaning.

The traditional formulations for top-loading washing machines are typically higher sudsing and can be more easily formulated from better-cleaning surfactant compositions with low or no fatty acid (soap) or nonionic surfactant. In contrast, front-loading washing machines typically cannot have high sudsing during the wash cycle due to engineering constraints. Manufacturers of such machines have put suds detectors in place to ensure that the machines do not leak during the wash cycle. Machines will typically shut off ("suds lock"), at least temporarily, during high levels of suds creation to allow the suds to dissipate. Therefore, under most circumstances, if a top-loading detergent is used in a front-loading machine, the machine will either operate very slowly (stopping several times during the cycle to allow suds to subside) or will shut down altogether. Either result is extremely frustrating to the consumer.

Detergent manufacturers have addressed this problem by developing separate detergent formulations for front-loading washing machines. Such front-loading, high efficiency laundry detergents or "HE laundry detergents" are often sold in the same store area of North American stores as are the historical front-loading formulations but are marked by a consumer-recognizable "HE" symbol.

One such method of suds-control is to increase the level of fatty acid and/or nonionic surfactant in the formulation. However, while this may be a simple sounding solution when you are referencing just one formulation, it becomes logistically very difficult when trying to make two different types of formulas for each of the many different detergent formulations, scents, and types of cleaning. Furthermore, having two different formulations which are similarly marketed to consumers can also cause consumer confusion and dissatisfaction if the wrong product is purchased by accident.

Therefore there is a need to provide one single laundry detergent composition that can meet consumers' needs in both types of machines.

Furthermore, traditionally top loading formulas can be higher sudsing and contain more of the better-cleaning surfactant systems containing low or no fatty acid (soap) or nonionic surfactants. However, to control suds in the HE formulations, greater amounts of these materials are typically used and can result in decreased cleaning capability of the formulation.

Therefore, there is a need to provide not only one single laundry detergent composition for both top loading and HE machines but to also provide a composition that provides good cleaning.

SUMMARY OF THE INVENTION

An aqueous liquid detergent composition is disclosed. The aqueous liquid detergent composition having suds compatibility and improved cleaning. The composition comprises from about 1% to about 60% surfactant, by weight of the composition, from about 0.001% to about 4.0%, by weight of the composition, of an anti-foam selected from organomodified silicone polymers with aryl or alkylaryl substituents combined with silicone resin and a primary filler, which is modified silica, and from about 0.01% to about 2.5%, by weight of the composition, of a structurant, wherein the structurant is selected from: crystalline, hydroxyl-containing stabilizers, polymer gums, and mixtures thereof. The surfactant system comprises linear alkylbenzene sulfonate and between 1% and 30% by weight of alkyl ethoxylated sulfate surfactant. The ratio of linear alkylbenzene sulfonate to alkyl ethoxylated sulfate surfactant is between 1.1:1 to 10:1.

Further, disclosed is an aqueous liquid detergent composition. The aqueous liquid detergent composition having suds compatibility and improved cleaning. The composition comprises from about 0.001% to about 4.0%, by weight of the composition, of an anti-foam selected from organomodified silicone polymers with aryl or alkylaryl substituents combined with silicone resin and a primary filler, which is modified silica, and from about 0.01% to about 2.5%, by weight of the composition, of a structurant, wherein the structurant is selected from: crystalline, hydroxyl-containing stabilizers, polymer gums, and mixtures thereof. The surfactant system comprises linear alkylbenzene sulfonate and between 1% and 30% by weight of alkyl ethoxylated sulfate surfactant. The ratio of linear alkylbenzene sulfonate to alkyl ethoxylated sulfate surfactant is between 1.1:1 to 10:1. The ratio of linear alkylbenzene sulfonate to alkyl ethoxylated sulfate surfactant is between 1.2:1 to 5:1, and the alkyl portion of the alkyl ethoxylated sulfate surfactant (AES) includes, on average, from 13.9 to about 14.6 carbon atoms.

DETAILED DESCRIPTION OF THE INVENTION

As used herein, "laundry detergent composition" includes any composition comprising a fluid capable of wetting and cleaning fabric e.g., clothing, in a domestic washing machine. The composition can include solids or gases in suitably subdivided form, but the overall composition excludes product forms which are nonfluid overall, such as tablets or granules. The compact fluid detergent compositions preferably have densities in the range from 0.9 to 1.3 grams per cubic centimeter, more specifically from 1.00 to 1.10 grams per cubic centimeter, excluding any solid additives but including any bubbles, if present.

All percentages, ratios and proportions used herein are by weight percent of the composition, unless otherwise specified. All average values are calculated "by weight" of the composition or components thereof, unless otherwise expressly indicated.

Aqueous Liquid Detergent Composition

The aqueous liquid detergent compositions herein are preferably laundry detergent compositions and are more preferably dual-usage aqueous liquid laundry detergent compositions, meaning for use in both HE and top-loading domestic washing machines found traditionally in the North American households. While the advantage of these compositions of combined cleaning and appropriate sudsing levels is best seen in this market, such compositions may of course be used in other laundry and general detergency fields.

The aqueous liquid detergent compositions herein therefore contain: water, a surfactant system containing: less than 30% of AES; greater than 10% of nonionic surfactant; an anti-foam; and a structurant. The liquid detergent composition may comprise a ratio of LAS to AES of greater than 1.1 such as LAS:AES ratios of between 1.1:1 to 10:1. Such compositions are discussed more fully below.

The present invention includes liquid and/or gel form laundry detergents, including packaged forms thereof, comprising a flowable laundry composition contained in a package, wherein (i) the flowable laundry composition has a viscosity of at least 100 mPa·s, preferably at least 500 mPa·s, when in rest or up to a shear stress of 10 Pa·s.

The composition may have a viscosity of from about 100 to about 2000 mPa*s, or from about 100 to about 1000 mPa*s, or from about 200 to about 500 mPa*s, at 20° C. and a shear rate of 20 $s_{-1}$. The composition may have a viscosity of greater than 200 cps, measured at 20 $s_{-1}$ and 20° C. At rest, the composition may have a viscosity of up to 10 Pa*s or up to 20 Pa*s, measured at a 0.2 $s_{-1}$ and 20° C.

Water

The detergent compositions herein may be concentrated aqueous liquid or gel-form laundry detergent compositions. The water content of the detergent compositions of the present invention is at least 1%, alternatively from about 1% to about 45%, alternatively from about 10% to about 40% by weight of the composition, of water. In one embodiment, the composition comprises from about 35% to about 99%, alternatively from about 40% to about 90%, by weight of the composition, of water.

Surfactant System

The detergent compositions herein comprise from about 1% to about 60%, alternatively from about 5% to about 50%, alternatively from about 15% to about 35%, by weight of the composition, of a surfactant system. In one embodiment, the detergent composition comprises from about 20% to about 30%, by weight of the composition, of the surfactant system.

The surfactant systems of the present disclosure include a mixture of surfactants. The surfactant systems may comprise, at least, alkyl ethoxylated sulfate surfactant (AES) and linear alkyl benzene sulfonate surfactant (LAS).

The surfactant system may comprise alkyl ethoxylated sulfate surfactant (AES). The AES may include an alkyl portion, an ethoxylated portion, and a sulfate head group. The AES may be formed by providing an alcohol feedstock, such as an ethoxylated alcohol feedstock, and sulfating the alcohol. The alcohol and/or AES surfactant of the present disclosure may include mixtures of feedstocks from more than one source, for example two or more sources.

The AES surfactant may include a distribution of AES molecules having alkyl portions in a variety of lengths. Typically, the alkyl portion may range in length from 8 to 20 carbons, or from 10 to 18 carbons.

The AES of the present disclosure may include relatively long alkyl portions, making the AES molecules relatively hydrophobic. The alkyl portion of the AES may be linear or branched.

The alkyl portion of the AES may include, on average, from 13.7 to about 16, or from about 13.9 to about 14.6, carbon atoms. At least about 50%, or at least about 60%, of the AES molecules may include an alkyl portion having 14 or more carbon atoms, preferably from 14 to 18, or from 14 to 17, or from 14 to 16, or from 14 to 15 carbon atoms.

The AES of the present disclosure may be characterized by an average degree of ethoxylation. The AES may have an average degree of ethoxylation of from about 1.5 to about 3, or from about 1.8 to about 2.5.

The compositions of the present disclosure may include from about 2% to about 10%, or from about 4% to about 10%, or from about 6% to about 8%, by weight of the composition, of AES. The surfactant systems of the present disclosure may include from up to 30% or from about 5% to about 25%, or from about 15% to about 28%, by weight of the surfactant system, of AES.

Suitable AES according to the present disclosure may be synthesized from feedstocks having a suitable hydrophobe, such as alkyl alcohol feedstocks. The feedstocks may be natural and/or synthetic feedstocks. The feedstocks may be linear, branched, or combinations thereof. The feedstocks may be derived from vegetable oils such as coconut and palm kernel. The feedstocks may be branched alcohols, for example 2-alkyl branched alcohols (as hydrophobes) that have branching, e.g., 100% branching, at the C2 position (C1 is the carbon atom that is or will be covalently attached to the alkoxylated sulfate moiety). 2-alkyl branched alcohols, e.g., 2-alkyl-1-alkanols or 2-alkyl primary alcohols, which may be derived from the oxo process, are commercially available from Sasol, e.g., LIAL® and/or ISALCHEM® (which is prepared from LIAL® alcohols by a fractionation process), and/or from Shell, e.g. Neodols® (which may be prepared via a modified oxo process). The branched alcohols may be mid chain branched with one or more $C_1$-$C_4$ alkyl moieties branched on the longer linear chain, or branched alcohols with a methyl branch randomly distributed along the hydrophobe chain. In some examples, the branched alcohols may contain cyclic moieties. Feedstocks, such as alkyl alcohols, may be ethoxylated and/or sulfonated according to known methods.

The surfactant systems of the present disclosure may include linear alkyl benzene sulfonate surfactant (LAS). The LAS may have an average chain length of from about 10 to about 16 carbon atoms, more preferably from about 11 to about 14 carbon atoms, even more preferably about 11.8.

The compositions of the present disclosure may include from about 1% to about 30%, or from about 5% to about 25%, or from about 7% to about 20% by weight of the composition, of LAS. The surfactant systems of the present disclosure may include from about 30% to about 75% or from about 40% to about 60%, by weight of the surfactant system, of LAS.

Suitable alkyl benzene sulphonate (LAS) may be obtained by sulphonating commercially available linear alkyl benzene (LAB). Suitable LAB includes low 2-phenyl LAB, such as those supplied by Sasol under the tradename Isochem® or those supplied by Petresa under the tradename Petrelab®. Other suitable LAB include high 2-phenyl LAB, such as those supplied by Sasol under the tradename Hyblene®. A suitable anionic detersive surfactant is alkyl benzene sulphonate that is obtained by DETAL catalyzed process, although other synthesis routes, such as hydrofluoric-acid-catalyzed (HF-catalyzed) routes, may also be suitable.

The AES and LAS of the present disclosure may be present in a weight ratio. The composition may include, by weight, more LAS than AES. The LAS and the AES may be present in a weight ratio of from about 1.1:1 to about 10:1, or from about 1.2:1 to about 5:1, or from about 1.5:1 to about 3:1.

The surfactant systems of the present disclosure may include amine oxide.

Suitable amine oxide surfactants include C10-C18 alkyl dimethyl amine oxide, and C10-18 acylamido alkyl dimethyl amine oxide.

Furthermore, amine oxide surfactants having the formula: $R(EO)_x(PO)_y(BO)_zN(O)(CH_2R')_2 \cdot qH_2O$ (I) are also useful in compositions of the present invention. R is a relatively long-chain hydrocarbyl moiety which can be saturated or unsaturated, linear or branched, and can contain from 8 to 20, preferably from 10 to 16 carbon atoms, and is more preferably C12-C16 primary alkyl. R' is a short-chain moiety preferably selected from hydrogen, methyl and $—CH_2OH$. When x+y+z is different from 0, EO is ethyleneoxy, PO is propyleneneoxy and BO is butyleneoxy. Amine oxide surfactants are illustrated by C12-14 alkyldimethyl amine oxide.

The compositions may include from about 0.1%, or from about 0.2%, or from about 0.3%, to about 2%, or to about 1.5%, or to about 1%, or to about 0.8%, or to about 0.6%, by weight of the composition, of amine oxide. The composition may include from about 0.3% to about 0.6%, by weight of the composition, of amine oxide.

The surfactant system may be substantially free, for example less than 1% by weight of the composition, of anionic mid-chain branched surfactants, such as mid-chain branched sulfates and/or mid-chain branched sulfonates.

Nonionic Surfactant

The detergent compositions herein comprise from 10% to about 50%, by weight of the surfactant system, of nonionic surfactant. In one embodiment, the detergent compositions comprise from about 15% to about 45%, alternatively, between 20% and 40%, by weight of the surfactant system, of nonionic surfactant. The compositions of the present disclosure may include from about 2% to about 20%, or from about 3% to about 16%, by weight of the composition, of nonionic surfactant.

Nonionic surfactants useful herein include, C12-C18 alkyl ethoxylates ("AE") including the so-called narrow peaked alkyl ethoxylates and C6-C12 alkyl phenol alkoxylates (especially ethoxylates and mixed ethoxy/propoxy), block alkylene oxide condensate of C6-C12 alkyl phenols, alkylene oxide condensates of C8-C22 alkanols and ethylene oxide/propylene oxide block polymers (Pluronic*-BASF Corp.), Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof.

An extensive disclosure of these types of surfactants is found in U.S. Pat. No. 3,929,678, Laughlin et al., issued Dec. 30, 1975.

Nonionic surfactants useful herein include those of the formula R1(OC2H4)nOH, wherein R1 is a C10 C16 alkyl group or a C8 C12 alkyl phenyl group, and n is from 3 to about 80. In some embodiments, the nonionic surfactants may be condensation products of C12 C15 alcohols with from about 5 to about 20 moles of ethylene oxide per mole of alcohol, e.g., C12 C13 alcohol condensed with about 6.5 moles of ethylene oxide per mole of alcohol.

Specific nonionic surfactants may include alcohols having an average of from about 12 to about 16 carbons, and an average of from about 3 to about 9 ethoxy groups, such as C12-C14 EO7, C12-C14 EO9, C14-C15 EO7 and C12-C15 EO7 nonionic surfactant.

Additional suitable nonionic surfactants include polyhydroxy fatty acid amides of the formula:

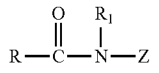

wherein R is a C9-17 alkyl or alkenyl, R1 is a methyl group and Z is glycidyl derived from a reduced sugar or alkoxylated derivative thereof. Examples are N-methyl N-1-deoxyglucityl cocoamide and N-methyl N-1-deoxyglucityl oleamide. Processes for making polyhydroxy fatty acid amides are known and can be found in Wilson, U.S. Pat. No. 2,965,576 and Schwartz, U.S. Pat. No. 2,703,798.

Other useful nonionic surfactants are methyl ester ethoxylates, alkyl polyglycosides, alkyl polyhydroxyamides (glucamides), and glycerol monoethers.

Soap

The detergent compositions herein may comprise from 0% to about 10%, by weight of the surfactant system, of soap. Soaps, also referred to as "fatty acid carboxylates" are formed by the neutralization of fatty acids to form primary carboxylates or soaps having the general formula:

$$RCOO\text{-}M^{+}$$

wherein R is typically a $C_9$-$C_{21}$ alkyl group, which may be straight chain or branched chain, and M is a cation. In specific embodiments, R is a $C_9$-$C_{17}$ alkyl, and more specifically R is $C_{11}$-$C_{15}$.

Examples of fatty acids useful herein are selected from the group consisting of lauric acid, tridecylic acid, myristic acid, pentadecylic acid, palmitic acid, margaric acid, stearic acid, arachidic acid, phytanic acid, behenic acid, palmitoleic acid, oleic acid, elaidic acid, vaccenic acid, linoleic acid, cis-eleostearic acid, trans-eleosteric acid, linolenic acid, arachidonic acid and combinations thereof. Fatty acids can be saturated or unsaturated. Unsaturated fatty acids typically having an iodine value from 15 to 25, preferably from 18 to 22 and a cis: trans isomer ratio from 1:1 to 200:1, preferably from 10:1 to 200:1.

Preferred sources of fatty acid are selected from the group consisting of coconut, soybean, tallow, palm, palm kernel, rapeseed, lard, sunflower, corn, safflower, canola, olive, peanut and combinations thereof.

Additional Surfactant

The surfactant systems herein may further comprise from 0% to about 65%, alternatively from about 15% to about 50%, by weight of the surfactant system, of an additional surfactant selected from other anionic surfactants, cationic surfactants, amphoteric surfactants, zwitterionic surfactants, and mixtures thereof.

Other Anionic Surfactants

The detergent compositions may comprise one or more other anionic surfactants in addition to the AES. By nature, every anionic surfactant known in the art of detergent compositions may be used, such as disclosed in "Surfactant Science Series", Vol. 7, edited by W. M. Linfield, Marcel Dekker.

Anionic sulphate salts suitable for use herein include the primary and secondary alkyl sulphates, having a linear or branched alkyl or alkenyl moiety having from 9 to 22 carbon atoms or more preferably 12 to 18 carbon atoms.

Also useful are beta-branched alkyl sulphate surfactants or mixtures of commercial available materials, having a weight average (of the surfactant or the mixture) branching degree of at least 50%.

Mid-chain branched alkyl sulphates or sulfonates are also suitable anionic surfactants for use in the compositions of the invention. Preferred are the C5-C22, preferably C10-C20 mid-chain branched alkyl primary sulphates. When mixtures are used, a suitable average total number of carbon atoms for the alkyl moieties is preferably within the range of from greater than 14.5 to 17.5. Preferred mono-methyl-branched primary alkyl sulphates are selected from the group consisting of the 3-methyl to 13-methyl pentadecanol sulphates, the corresponding hexadecanol sulphates, and mixtures thereof. Dimethyl derivatives or other biodegradable alkyl sulphates having light branching can similarly be used.

Other suitable anionic surfactants for use herein include and/or alkyl polyalkoxylated carboxylates (AEC).

The anionic surfactants are typically present in the form of their salts with alkanolamines or alkali metals such as sodium and potassium. Preferably, the anionic surfactants are neutralized with alkanolamines such as Monoethanolamine or Triethanolamine, and are fully soluble in the liquid phase.

Other Surfactants

Cationic surfactants: Cationic surfactants of use in the present invention can be water-soluble, water-dispersible or water-insoluble. Such cationic surfactants have at least one quaternized nitrogen and at least one long-chain hydrocarbyl group. Compounds comprising two, three or even four long-chain hydrocarbyl groups are also included. Examples include alkyltrimethylammonium salts, such as C12 alkyltrimethylammonium chloride, or their hydroxyalkyl substituted analogs. Compositions known in the art may comprise, for example, 1% or more of cationic surfactants, such as C12 alkyltrimethylammonium chloride. Such cationic surfactants are organic cationically charged moieties. Without intending to be limited by theory, they are capable of ion-pairing with the anionic surfactants in the composition, and interfering with the deposition aid. In preferred embodiments of the present invention, the use of such organic cationically charged moieties, especially cationic surfactants, is avoided.

Alkylpolysaccharides such as disclosed in U.S. Pat. No. 4,565,647 Llenado are also useful nonionic surfactants in the compositions of the invention.

Also suitable are alkyl polyglucoside surfactants.

Amphoteric and/or zwitterionic surfactants:

Suitable amphoteric or zwitterionic detersive surfactants for use in the fluid laundry detergent compositions of the present invention include those which are known for use in hair care or other personal care cleansing. Non-limiting examples of suitable zwitterionic or amphoteric surfactants are described in U.S. Pat. No. 5,104,646 (Bolich Jr. et al.), U.S. Pat. No. 5,106,609 (Bolich Jr. et al.).

Amphoteric detersive surfactants suitable for use in the composition include those surfactants broadly described as derivatives of aliphatic secondary and tertiary amines in which the aliphatic radical can be straight or branched chain and wherein one of the aliphatic substituents contains from 8 to 18 carbon atoms and one contains an anionic group such as carboxy, sulfonate, sulfate, phosphate, or phosphonate. Suitable amphoteric detersive surfactants for use in the present invention include, but are not limited to: cocoamphoacetate, cocoamphodiacetate, lauroamphoacetate, lauroamphodiacetate, and mixtures thereof.

Zwitterionic detersive surfactants suitable for use in the compositions are well known in the art, and include those surfactants broadly described as derivatives of aliphatic quaternary ammonium, phosphonium, and sulfonium compounds, in which the aliphatic radicals can be straight or branched chain, and wherein one of the aliphatic substituents contains from 8 to 18 carbon atoms and one contains an anionic group such as carboxy, sulfonate, sulfate, phosphate or phosphonate. Zwitterionics such as betaines are suitable for this invention.

Examples of other traditional anionic, zwitterionic, amphoteric or optional additional surfactants suitable for use in the compositions are described in McCutcheon's, Emulsifiers and Detergents, 1989 Annual, published by M. C. Publishing Co., and U.S. Pat. Nos. 3,929,678, 2,658,072; 2,438,091; 2,528,378. Mixtures of two or more surfactants may be used.

Anti-Foam

The detergent compositions herein comprise from about 0.001% to about 4.0%, by weight of the composition, of an anti-foam selected from silicone anti-foam compounds; anti-foam compounds of silicone oils and hydrophobic particles; and mixtures thereof. In one embodiment, the detergent compositions herein comprise from about 0.01% to about 2.0%, alternatively from 0.05% to about 1.0%, by weight of the composition, of the silicone anti-foam. (Percentages by active amount not including any carrier).

In one embodiment, the anti-foam is selected from: organomodified silicone polymers with aryl or alkylaryl substituents combined with silicone resin and modified silica; M/Q resins; and mixtures thereof.

In one embodiment, the anti-foam is selected from organomodified silicone polymers with aryl or alkylaryl substituents combined with silicone resin and a primary filler.

Particularly preferred are silicone anti-foam compounds consisting of organomodified silicone polymers with aryl or alkyaryl substituents combined with silicone resin and modified silica as described in U.S. Pat. Nos. 6,521,586 B1, 6,521,587 B1, US Patent Applications 2005 0239908 A1, 2007 01673 A1 to Dow Corning Corp. and US Patent Application 2008 0021152 A1 to Wacker Chemie A G.

In one embodiment, the silicone anti-foam may be prepared as described in U.S. Pat. No. 6,521,586 to Dow Corning Corp. and the anti-foam is selected from:

a) mixtures of from about 80 to about 92% ethylmethyl, methyl (2-phenylpropyl) siloxane; from about 5 to about 14% MQ resin in octyl stearate; and from about 3 to about 7% modified silica;
b) mixtures of from about 78 to about 92% ethylmethyl, methyl (2-phenylpropyl) siloxane; from about 3 to about 10% MQ resin in octyl stearate; from about 4 to about 12% modified silica; and
c) mixtures thereof.

wherein percentages are by weight of the anti-foam.

Anti-foams useful herein are selected from mixtures of:

i) organomodified silicone polymers having aryl or alkaryl substituents, in combination with a primary filler, preferably a modified silica; and
ii) silicone resins, preferably M/Q resins.

The organomodified silicone polymer with aryl or alkaryl substituents (in component (i)) is suitably selected from at least one organosilicon compound which has units of the formula $R_a(R^1O)_bR^2_cSiO_{(4-a-b-c)/2}$ (1) in which each R can be identical or different and is H or a monovalent, SiC-bonded, optionally substituted, aliphatic hydrocarbon radical and comprises at least one aromatic hydrocarbon radical covalently attached to silicon via aliphatic groups. $R^1$ can be identical or different and is H or a monovalent, optionally substituted hydrocarbon radical which is attached to Si via a carbon ring atom, $R^2$ can be identical or different and is a monovalent, optionally substituted, aromatic hydrocarbon radical which is attached to the silicon atom via a carbon ring atom, a is 0, 1, 2 or 3, b is 0, 1, 2 or 3 and c is 0, 1, 2 or 3, with the proviso that the sum a+b+c is less than or equal to 3, and in 1-100%, preferably in 10-60%, more preferably in 20-40% of all units of the formula (I) per molecule, c is other than 0, and in at least 50% of all of the units of the formula (I) in the organosilicon compound the sum a+b+c is 2.

The silicone resin (component (ii)) is suitably an organopolysiloxane resin made up of units of the formula $R^3_a(R^4O)_eSiO_{(4-d-e)/2}$ (II) in which R3 can be identical or different and is H or a monovalent, optionally substituted, SiC-bonded hydrocarbon radical. R4 can be identical or different and is H or a monovalent, optionally substituted hydrocarbon radical, d is 0, 1, 2 or 3 and e is 0, 1, 2 or 3, with the proviso that the sum d+e≤3 and in less than 50% of all of the units of the formula (II) in the organopolysiloxane resin the sum d+e is 2, The anti-foam may further optionally comprise an organosilicon compound which has units of the formula $R^5_g(R^6O)_hSiO_{(4-g-h)/2}$ (III) in which $R^5$ can be identical or different and has a meaning given for R, $R^6$ can be identical or different and has a meaning given for $R^1$, g is 0, 1, 2 or 3 and his 0, 1, 2 or 3, with the proviso that the sum g+h≤3 and in at least 50% of all of the units of the formula (IV) in the organosilicon compound the sum g+h is 2.

In one embodiment, the organomodified silicone polymers having aryl or alkaryl substituents component comprises aromatic radicals attached directly to the silicon atom. In such polymers, there is a covalent bond between a silicon atom in the unit of the formula (I) and a carbon atom belonging to the aromatic ring.

Examples of radicals R are alkyl radicals, such as the methyl, ethyl, n-propyl, isopropyl, n-butyl, isobutyl, tert-butyl, n-pentyl, isopentyl, neopentyl, tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical; alkenyl radicals, such as the vinyl and the allyl radical; cycloalkyl radicals, such as cyclopentyl, cyclohexyl, cycloheptyl radicals and methylcyclohexyl radicals, and aromatic groups attached via aliphatic groups to the silicon atom, such as the benzyl radical, phenylethyl radical or the 2-phenylpropyl radical.

Examples of substituted radicals R are 3,3,3-trifluoro-n-propyl radical, cyanoethyl, glycidyloxy-n-propyl, polyalkylene glycol-n-propyl, amino-n-propyl, aminoethylamino-n-propyl, and methacryloyloxy-n-propyl radicals.

Preferably radical R comprises hydrogen atom or optionally substituted, aliphatic hydrocarbon radicals having 1 to 30 carbon atoms, more preferably aliphatic hydrocarbon radicals having 1 to 4 carbon atoms, and in particular the methyl radical.

Examples of radical $R^1$ are hydrogen atom and the radicals indicated for radical R and $R^2$.

Preferably radical $R^1$ comprises hydrogen atom or optionally substituted hydrocarbon radicals having 1 to 30 carbon atoms, more preferably hydrogen atom or hydrocarbon radicals having 1 to 4 carbon atoms, especially methyl or ethyl radicals.

Examples of $R^2$ are aryl radicals, such as phenyl, toloyl, xylyl, cumyl, naphthyl and anthracyl radicals.

Radical $R^2$ is preferably the phenyl radical.

Radical $R^2$ is preferably 10 to 100%, more preferably 15 to 50%, of the SiC-bonded radicals in component (i). Preferably b is 0 or 1, more preferably 0. Preferably c is 0, 1 or 2.

Preferably, less than 5%, especially less than 1%, of the radicals R are hydrogen atom.

The organosilicon compounds containing units of the formula (I) that are used as component (i) are preferably branched or linear organopolysiloxanes which more preferably are composed of units of the formula (I).

In the context of the present invention the term "organopolysiloxanes" is intended to embrace polymeric, oligomeric and dimeric siloxanes.

Examples of the organomodified silicone polymers having aryl or alkaryl substituents in component (i) of the invention are those comprising units $Ph_3SiO_{1/2}$—, $Ph_2MeSiO_{1/2}$—, $PhMe_2SiO_{1/2}$—, $Ph_2SiO_{2/2}$—, $PhMeSiO_{2/2}$— and $PhSiO_{3/2}$—, where Me denotes methyl radical and Ph denotes phenyl radical, such as, for example, linear polysiloxanes of the formulae $Me_3SiO\ (Ph_2SiO)_x(Me_2SiO)$, $SiMe_3$, $Me_3SiO(PhMeSiO)_y(Me_2SiO)$, $SiMe_3$, $Me_3SiO(Ph_2SiO)_x(PhMeSiO)_y(Me_2SiO)_2SiMe_3$, and $Me_3SiO(Ph_2SiO)_x(Me_2SiO)_2SiMe_3$, and also branched polysiloxanes of formulae the $MeSi[O(Ph_2SiO)_x(Me_2SiO)_2SiMe_3]_3$, $PhSi[O(PhMeSiO)_y(Me_2SiO)_zSiMe_3]_3$, and $Me_3SiO(Me_2SiO)$, $[PhSiO(OMe_2SiO)$, $SiMe_3]_v(Me_2SiO)$, $SiMe_3$, the coefficients v, x, and y independently of one another adopting values greater than or equal to 1, and z being 0 or greater than or equal to 1. The sum of v, x, y, and z determines the degree of polymerization, v the number of branches, and hence the viscosity.

The organomodified silicone polymers having aryl or alkaryl substituents of the invention have a viscosity of preferably 10 to 1 000 000 mPas, more preferably from 100 to 50 000 mPas, in particular from 500 to 5 000 mPas, measured in each case at 25° C.

The organomodified silicone polymers having aryl or alkaryl substituents of the invention are commercially available products or can be prepared by any methods known to date in organosilicon chemistry, such as, for example, by cohydrolysis of the corresponding silanes.

The anti-foams used in the invention may comprise primary filler, preferably a modified silica, in amounts of preferably 0.1 to 30 parts by weight, more preferably 1 to 15 parts by weight, based in each case on 100 parts by weight of component (i).

Primary fillers employed in accordance with the invention may comprise exclusively pulverulent fillers, more preferably pulverulent hydrophobic fillers.

Preferably the primary filler component has a BET surface area of 20 to 1000 $m^2/g$, a particle size of less than 10 μm and an agglomerate size of less than 100 μm.

Examples of primary fillers are silicon dioxide (silicas), titanium dioxide, aluminum oxide, metal soaps, quartz flour, PTFE powders, fatty acid amides, ethylenebisstearamide for example, and finely divided hydrophobic polyurethanes.

As primary filler component it is preferred to use silicon dioxide (silicas), titanium dioxide or aluminum oxide having a BET surface area of 20 to 1000 $m^2/g$, a particle size of less than 10 μm and an agglomerate size of less than 100 μm.

Of particular preference as primary filler component are silicas, particularly those having a BET surface area of 50 to 800 $m^2/g$. These silicas may be pyrogenic or precipitated silicas+.

As primary filler it is possible to use both pretreated silicas, i.e., commercially customary hydrophobic silicas, and hydrophilic silicas.

Examples of hydrophobic silicas which can be used in accordance with the invention are HDK® H2000, a pyrogenic, hexamethyldisilazane-treated silica having a BET surface area of 140 $m^2/g$ (available commercially from Wacker-Chemie GmbH, Germany) and a precipitated, polydimethylsiloxane-treated silica having a BET surface area of 90 $m^2/g$ (available commercially under the name "Sipernat® D10" from Degussa A G, Germany).

If hydrophobic silicas are to be used as primary filler component, it is also possible to hydrophobicize hydrophilic silicas in situ, if to do so is advantageous for the desired effectiveness of the anti-foams. There are many known methods of hydrophobicizing silicas. The hydrophilic silica can be hydrophobicized in situ by, for example, heating the silica in dispersion in component (i) or in a mixture of organomodified silicone polymers having aryl or alkaryl substituents with silicone resins (ii) at temperatures of 100 to 200° C. for a number of hours. This reaction can be assisted by the addition of catalysts, such as KOH, and of hydrophobicizers, such as short-chain OH-terminated polydimethylsiloxanes, silanes or silazanes. This treatment is also possible when using commercially customary hydrophobic silicas, and may contribute to improved effectiveness. Another possibility is to use a combination of silicas hydrophobicized in situ with commercially customary hydrophobic silicas.

Examples of radical $R^3$ are hydrogen atom and the radicals indicated for radical R and $R^2$.

Preferably $R^3$ comprises optionally substituted hydrocarbon radicals having 1 to 30 carbon atoms, more preferably hydrocarbon radicals having 1 to 6 carbon atoms, and in particular the methyl radical.

Examples of radical $R^4$ are the radicals indicated for the radical $R^1$.

Radical $R^4$ preferably comprises hydrogen atom or hydrocarbon radicals having 1 to 4 carbon atoms, particularly hydrogen atom, methyl radicals or ethyl radicals.

Preferably the value of d is 3 or 0.

The resin component (ii) used in accordance with the invention preferably comprises silicone resins made up of units of the formula (II) for which in less than 30%, preferably in less than 5%, of the units in the resin the sum d+e is 2.

With particular preference the silicone resin component (ii) comprises organopolysiloxane resins composed essentially of $R^3{}_3SiO_{1/2}$ (M) and $SiO_{4/2}$ (Q) units with $R^3$ the same as the abovementioned definition; these resins are also called MQ resins. The molar ratio of M to Q units is preferably in the range from 0.5 to 2.0, more preferably in the range from 0.6 to 1.0. These silicone resins may additionally contain up to 10% by weight of free hydroxyl or alkoxy groups.

Preferably the resin component (ii) has a viscosity at 25° C. of more than 1000 mPas or are solids. The weight-average molecular weight determined by gel permeation chromatography (relative to a polystyrene standard) of these resins is preferably 200 to 200 000 g/mol, in particular 1000 to 20 000 g/mol.

The resin component (ii) comprises commercially customary products or can be prepared by methods that are commonplace in silicon chemistry, in accordance for example with EP-A 927 733.

The anti-foam moreover includes embodiments comprising both the primary filler (preferably a modified silica) and a resin (ii) at a weight ratio in the order recited, of from 0.01 to 50, more preferably 0.1 to 7.

Examples of radicals $R^5$ are the examples indicated for radical R.

Preferably radical $R^5$ comprises hydrogen atom or optionally substituted, aliphatic hydrocarbon radicals having 1 to 30 carbon atoms, more preferably aliphatic hydrocarbon radicals having 1 to 4 carbon atoms, and especially the methyl radical.

Examples of radical $R^6$ are hydrogen atom and the radicals indicated for radical R and $R^2$.

Preferably radical $R^6$ comprises hydrogen atom or optionally substituted hydrocarbon radicals having 1 to 30 carbon atoms, more preferably hydrogen atom or hydrocarbon radicals having 1 to 4 carbon atoms, and especially methyl radicals or ethyl radicals.

The value of g is preferably 1, 2 or 3. The value of h is preferably 0 or 1.

In addition to components (i) and (ii), the anti-foams comprise a further substance such as have also been used to date in defoamer formulations, such as, for example, water-insoluble organic compounds.

The term "water-insoluble" is intended to be understood for the purposes of the present invention as meaning a solubility in water at 25° C. under a pressure of 1013.25 hPa of not more than 2 percent by weight.

Water-insoluble organic compounds, used optionally, preferably comprises water-insoluble organic compounds having a boiling point greater than 100° C. under the pressure of the surrounding atmosphere, i.e., under 900 to 1100 hPa, and particularly compounds selected from mineral oils, natural oils, isoparaffins, polyisobutylenes, residues from the synthesis of alcohols by the oxo process, esters of low molecular mass synthetic carboxylic acids, fatty acid esters, such as octyl stearate and dodecyl palmitate, for example, fatty alcohols, ethers of low molecular mass alcohols, phthalates, esters of phosphoric acid, and waxes.

The anti-foams used in the invention may contain water-insoluble organic compound in amounts of preferably 0 to 1000 parts by weight, more preferably 0 to 100 parts by weight, based in each case on 100 parts by weight of the total weight of components (i), (ii) and, where used, silicone having no aryl moieties.

The components used in the invention may in each case comprise one kind of one such component or else a mixture of at least two kinds of each individual component.

The anti-foams used in the present invention are preferably viscous, clear to opaque, colorless to brownish liquids. The anti-foams used in the present invention preferably have a viscosity of 10 to 2,000,000 mPas, in particular of 2,000 to 50,000 mPas, in each case at 25° C.

Organopolysiloxane+Organosilicon Resin+Hydrophobic Filler

Anti-foams useful herein include those silicone anti-foams described in U.S. Pat. Nos. 6,251,586 and 6,251,587, both to Dow Corning. Such anti-foams comprise (A) an organopolysiloxane material having at least one silicon-bonded substituent of the formula X--Ph, wherein X denotes a divalent aliphatic organic group bonded to silicon through a carbon atom and Ph denotes an aromatic group, (B) an organosilicon resin and (C) a hydrophobic filler. The aromatic group can be unsubstituted or substituted.

The organopolysiloxane material (A) is preferably a fluid and is preferably a polydiorganosiloxane. The polydiorganosiloxane (A) preferably comprises diorganosiloxane units of the formula

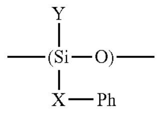

where Y is an alkyl group having 1 to 4 carbon atoms, preferably methyl. These diorganosiloxane units containing a —X--Ph group may comprise substantially all or a majority of the diorganosiloxane units in organopolysiloxane (A), but preferably comprise up to 50 or 60%, most preferably 5 to 40%, of the diorganosiloxane units in (A). The group X is preferably a divalent alkylene group having from 2 to 10 carbon atoms, most preferably 2 to 4 carbon atoms, but can alternatively contain an ether linkage between two alkylene groups or between an alkylene group and --Ph, or can contain an ester linkage. Ph is preferably a moiety containing at least one aromatic ring —$C_6$ $R_5$, wherein each R independently denotes hydrogen, halogen, hydroxyl, an alkoxy group having 1 to 6 carbon atoms or a monovalent hydrocarbon group having 1 to 12 carbon atoms, or wherein two or more R groups together represent a divalent hydrocarbon group. Ph is most preferably a phenyl group, but may be substituted for example by one or more methyl, methoxy, hydroxyl or chloro group, or two substituents R may together form a divalent alkylene group, or may together form an aromatic ring, resulting in conjunction with the Ph group in e.g. a naphthalene group. A particularly preferred X--Ph group is 2-phenylpropyl —$CH_2$—$CH(CH_3)$—$_{C6}H_5$. Alternatively, Ph can be a heterocyclic group of aromatic character such as thiophene, pyridine or quinoxaline.

The polydiorganosiloxane (A) also preferably comprises at least 50% diorganosiloxane units of the formula

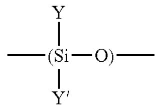

where Y' is a hydrocarbon group having 1 to 24 carbon atoms, preferably an aliphatic group of up to 6 carbon atoms, for example ethyl, propyl, isobutyl, methyl, hexyl or vinyl, or lauryl or a cycloalkyl group such as cyclohexylethyl. Mixtures of alkyl groups Y' can be used. It is believed that the enhanced foam control of the anti-foam agents of the invention may involve interaction between the Ph groups of (A) and the organosilicon resin (B), and the Ph groups may be more accessible if no long chain alkyl groups are present. Other groups can be present as Y', for example haloalkyl groups such as chloropropyl or acyloxyalkyl or alkoxyalkyl groups. At least some of the groups Y' can be phenyl groups or substituted phenyl groups such as tolyl; aromatic groups bonded direct to silicon are not equivalent to the groups —X--Ph but can be present as Y'.

The organopolysiloxane material (A) may be made by any suitable method, but preferably is made by hydrosilylation reaction between a siloxane polymer having a number of silicon-bonded hydrogen atoms with the appropriate amount of X"--Ph molecules, wherein X" is as described for X, but has aliphatic unsaturation in the terminal group, allowing addition reaction with the silicon-bonded hydrogen atoms of the siloxane polymer. Examples of suitable X"--Ph materials include styrene (which introduces 2-phenylethyl groups), α-methyl styrene, eugenol, allylbenzene, allyl phenyl ether, 2-allylphenol, 2-chlorostyrene, 4-chlorostyrene, 4-methylstyrene, 3-methylstyrene, 4-t-butylstyrene, 2,4- or 2,5-dimethylstyrene or 2,4,6-trimethylstyrene. α-methyl styrene introduces 2-phenylpropyl groups, which are believed to be mainly 2-phenyl-1-propyl groups but may include 2-phenyl-2-propyl groups. Mixtures of X"--Ph materials can be used, for example styrene with α-methyl styrene. Such hydrosilylation reaction is preferably carried out under conditions and in the presence of suitable catalysts as described, for example, in U.S. Pat. No. 4,741,861. A radical inhibitor is preferably present to prevent homopolymerisation of X"--Ph.

The organopolysiloxane material (A) may be a substantially linear polydiorganosiloxane or may have some branching. The branching may be in the siloxane chain, brought about e.g. by the presence of some tri-functional siloxane units of the formula $ZSiO_3/2$, where Z denotes a hydrocarbon, hydroxyl or hydrocarbonoxy group. Alternatively branching may be caused by a multivalent, e.g. divalent or trivalent, organic or silicon-organic moiety linking siloxane polymer chains. The organic moiety can be a divalent linking group of the formula —X'—, and the silicon-organic moiety can be a divalent linking group of the formula X'--Sx--X', where X' denotes a divalent organic group bonded to silicon through a carbon atom and Sx is an organosiloxane group. Examples of organic linking (branching) units are $C_{2-6}$ alkylene groups, e.g. dimethylene or hexylene, or aralkylene groups of the formula —X'—Ar—X'—, where Ar denotes phenylene. Hexylene units can be introduced by reaction of 1,5-hexadiene with Si—H groups and —X'—Ar—X'— units by reaction of divinylbenzene or diisopropylbenzene. Examples of silicon-organic linking units are those of the formula $—(CH_2)_d—(Si(CH_3)_2—O)_e—Si(CH_3)_2—(CH_2)_d—$ wherein d has a value of from 2 to 6 and e has a value of from 1 to 10; for example linking units of the latter formula with d=2 and e=1 can be introduced by reaction of divinyltetramethyldisiloxane with Si—H groups.

After the hydrosilylation reaction with the aromatic compound X"--Ph and any required reaction with a branching agent, the residual Si—H groups of the organopolysiloxane can be reacted with an alkene such as ethylene, propylene, isobutylene or 1-hexene, preferably in the presence of a hydrosilylation catalyst, to introduce the groups Y'.

It is preferred that the number of siloxane units (DP or degree of polymerisation) in the average molecule of material (A) is at least 5, more preferably from 10 to 5,000. Particularly preferred are materials (A) with a DP of from 20 to 1000, more preferably 20 to 200. The end groups of the organopolysiloxane (A) can be any of those conventionally present in siloxanes, for example trimethylsilyl end groups.

The organosilicon resin (B) is generally a non-linear siloxane resin and preferably consists of siloxane units of the formula $R'_a SiO_{4-a}/2$ wherein R' denotes a hydroxyl, hydrocarbon or hydrocarbonoxy group and wherein a has an average value of from 0.5 to 2.4. The resin preferably consists of monovalent trihydrocarbonsiloxy (M) groups of the formula $R''3\ SiO_1/2$ and tetrafunctional (Q) groups $SiO_{4/2}$ wherein R" denotes a monovalent hydrocarbon group. The number ratio of M groups to Q groups is preferably in the range 0.4:1 to 2.5:1 (equivalent to a value of a in the formula $R'_a SiO_{4-a}/2$ of 0.86 to 2.15), and is more preferably 0.4:1 to 1.1:1 and most preferably 0.5:1 to 0.8:1 (equivalent to a=1.0-1.33) for use in laundry detergent applications. The organosilicon resin (B) is preferably a solid at room temperature, but MQ resins having a M/Q ratio of higher than 1.2, which are generally liquid, can be used successfully. Although it is most preferred that the resin (B) consists only of M and Q groups as defined above, a resin comprising M groups, trivalent $R''SiO_3/2$ (T) groups and Q groups can alternatively be used. The organosilicon resin (B) can also contain divalent units $R''_2\ SiO_2/2$, preferably at no more than 20% of all siloxane units present. The group R" is preferably an alkyl group having from 1 to 6 carbon atoms, most preferably methyl or ethyl, or phenyl. It is particularly preferred that at least 80%, and most preferably substantially all of the R" groups present are methyl groups. Other hydrocarbon groups may also be present, e.g. alkenyl groups present for example as dimethylvinylsilyl units, preferably in small amounts, most preferably not exceeding 5% of all R" groups. Silicon bonded hydroxyl groups and/or alkoxy, e.g. methoxy, groups may also be present.

Such organosilicon resins are well known. They can be made in solvent or in situ, e.g. by hydrolysis of certain silane materials. Particularly preferred is the hydrolysis and condensation in the presence of a solvent, e.g. xylene, of a precursor of the tetravalent siloxy unit (e.g. tetra-orthosilicate, tetraethyl orthosilicate, polyethyl silicate or sodium silicate) and a precursor of mono-valent trialkylsiloxy units (e.g. trimethylchlorosilane, trimethylethoxysilane, hexamethyldisiloxane or hexamethyldisilazane). The resulting MQ resin can if desired be further trimethylsilylated to react out residual Si—OH groups or can be heated in the presence of a base to cause self-condensation of the resin by elimination of Si—OH groups.

The organosilicon resin (B) is preferably present in the anti-foam at 1-50% by weight based on organopolysiloxane (A), particularly 2-30% and most preferably 4-15%.

The organosilicon resin (B) may be soluble or insoluble (not wholly dissolved) in the organopolysiloxane (A) when present in the above amounts. Solubility can be measured by observing a mixture of (A) and (B) in an optical microscope. Enhanced foam control in detergent applications has been achieved both by compositions containing dissolved organosilicon resin (B) and by compositions containing dispersed particles of organosilicon resin (B). The factors affecting solubility of (B) in (A) include the proportion of X--Ph groups in (A) (more X--Ph groups increase solubility), the degree of branching in (A), the nature of the groups Y and Y' in (A) (long chain alkyl groups decrease solubility), the ratio of M to Q units in MQ resin (B) (higher ratio of M groups to Q groups increases solubility) and the molecular weight of (B). The solubility of (B) in (A) at ambient temperature can thus be from 0.01% by weight or less up to 15% or more. It may be advantageous to use a mixture of a soluble resin (B) and an insoluble resin (B), for example a mixture of MQ resins having different M/Q ratios. If the organosilicon resin (B) is insoluble in organopolysiloxane (A), the average particle size of resin (B), as measured when dispersed in liquid (A), may for example be from 0.5 to 400 μm, preferably 2 to 50 μm. For industrial foam control applications such as defoaming of black liquor in the paper and pulp industry, resins which are soluble in the siloxane copolymer, such as MQ resins having a high M/Q ratio, are usually preferred.

The resin (B) can be added into the anti-foam as a solution in a non-volatile solvent, for example an alcohol such as dodecanol or 2-butyl-octanol or an ester such as octyl stearate. The resin solution prepared in a volatile solvent, eg xylene, can be united with the non-volatile solvent and the volatile solvent may be removed by stripping or by other forms of separation. In most cases the non-volatile solvent can be left in the anti-foam. It is preferred that the resin (B) is dissolved in an equal amount of non-volatile solvent or less, more preferably no more than about half its weight of solvent. The resin (B) can alternatively be added in solution in a volatile solvent followed stripping off the solvent. If the resin (B) is added as a solution and is insoluble in organopolysiloxane material (A), it will form solid particles with an acceptable particle size on mixing.

The resin (B) can alternatively be added into the anti-foam in the form of solid particles, for example spray dried particles. Spray dried MQ resins are available commercially, for example of average particle size 10 to 200 microns.

The level of insolubility of resin (B) in organopolysiloxane material (A) may affect its particle size in the composition. The lower the solubility of the organosilicon resins in organopolysiloxane material (A), the larger the particle size tends to be when the resin is mixed as a solution into (A). Thus an organosilicon resin which is soluble at 1% by weight in organopolysiloxane material (A) will tend to form smaller particles than a resin which is only soluble at 0.01% by weight. Organosilicon resins (B) which are partly soluble in organopolysiloxane material (A), that is having a solubility of at least 0.1% by weight, are preferred.

The molecular weight of the resin (B) can be increased by condensation, for example by heating in the presence of a base. The base can for example be an aqueous or alcoholic solution of potassium hydroxide or sodium hydroxide, e.g. a solution in methanol or propanol. We have found that for some detergents, anti-foams containing the lower molecular weight MQ resins are the most effective at reducing foam but those containing MQ resins of increased molecular weight are more consistent in giving the same reduced foam levels under different conditions, for example at different wash temperatures or in different washing machines. The MQ resins of increased molecular weight also have improved resistance to loss of performance over time when stored in contact with the detergent, for example as an emulsion in liquid detergent. The reaction between resin and base may be carried out in the presence of the silica, in which case there may be some reaction between the resin and the silica. The reaction with base can be carried out in the presence of the organopolysiloxane (A) and/or in the presence of the non-volatile solvent and/or in the presence of a volatile solvent. The reaction with base may hydrolyse an ester non-volatile solvent such as octyl stearate but we have found that this does not detract from the foam control performance.

The third essential ingredient is a hydrophobic filler (C). Hydrophobic fillers for anti-foams are well known and may be such materials as silica, preferably with a surface area as measured by BET measurement of at least 50 $m^2/g$, titania, ground quartz, alumina, aluminosilicates, organic waxes e.g. polyethylene waxes and microcrystalline waxes, zinc oxide, magnesium oxide, salts of aliphatic carboxylic acids, reaction products of isocyanates with certain materials, e.g. cyclohexylamine, or alkyl amides, e.g. ethylenebisstearamide or methylenebisstearamide. Mixtures of one or more of these are also acceptable.

Some of the fillers mentioned above are not hydrophobic in nature, but can be used if made hydrophobic. This could be done either in situ (i.e. when dispersed in the organopolysiloxane material (A)), or by pre-treatment of the filler prior to mixing with material (A). A preferred filler is silica which is made hydrophobic. This can be done e.g. by treatment with a fatty acid, but is preferably done by the use of methyl substituted organo-silicon materials. Suitable hydrophobing agents include polydimethylsiloxanes, dimethylsiloxane polymers which are end-blocked with silanol or silicon-bonded alkoxy groups, hexamethyldisilazane, hexamethyldisiloxane and organosilicon resins comprising monovalent groups $(CH_3)$ 3 $SiO_1/2$ and tetravalent groups $SiO_2$ in a ratio of from 0.5/1 to 1.1/1 (MQ resins). Hydrophobing is generally carried out at a temperature of at least 80° C. Similar MQ resins can be used as the organosilicon resin (B) and as the hydrophobing agent for silica filler (C).

Preferred silica materials are those which are prepared by heating, e.g. fumed silica, or by precipitation, although other types of silica such as those made by gel-formation are also acceptable. The silica filler may for example have an average particle size of from 0.5 to 50 microns, preferably 2 to 30 μm, most preferably from 5 to 25 μm. Such materials are well known and are commercially available, both in hydrophilic form and in hydrophobic form.

The amount of filler (C) in the anti-foam is preferably 0.5 to 50% by weight based on organopolysiloxane material (A), particularly from 1 up to 10% or 15% and most preferably 2-8%. It is also preferred that the ratio of the weight of resin (B) to the weight of filler (C) is from 1/10 to 20/1, preferably 1/5 to 10/1 most preferably 1/2 to 6/1.

The anti-foams may be made in any convenient way, but preferably are provided by mixing the different ingredients under shear. The amount of shear is preferably sufficient to provide good dispersion of components (B) and (C) in material (A), but not so much that the particles (B) and/or (C) would be broken, thus possibly making them less effective, or re-exposing surfaces which are not hydrophobic. Where the filler (C) needs to be made hydrophobic in situ, the manufacturing process would include a heating stage, preferably under reduced pressure, in which the filler and the treating agent are mixed together in part or all of organopolysiloxane material (A), possibly in the presence of a suitable catalyst, where required.

The anti-foams according to the present invention may be provided as a simple mixture of (A), (B) and (C), but for some applications it may be preferred to make them available in alternative forms. For example for use in aqueous media, it maybe appropriate to provide the anti-foam in an emulsion form, preferably an oil/in/water emulsion.

Methods of providing silicone-based anti-foams in oil-in-water emulsion form are known and have been described in a number of publications and patent specifications. Examples are EP 913,187, EP 0879628, WO 98-22,196, WO 98-00216, GB 2,315,757, EP 499364, and EP 459,512. Emulsions may be made according to any of the known techniques, and may be macro-emulsions or micro-emulsions. In general, they comprise the anti-foam as the oil phase, one or more surfactants, water and standard additives, such as preservatives, viscosity modifiers, protective colloids and/or thickeners. The surfactants may be selected from anionic, cationic, nonionic or amphoteric materials. Mixtures of one or more of these may also be used. Suitable anionic organic surfactants include alkali metal soaps of higher fatty acids, alkyl aryl sulphonates, for example sodium dodecyl benzene sulphonate, long chain (fatty) alcohol sulphates, olefin sulphates and sulphonates, sulphated monoglycerides, sulphated esters, sulphonated ethoxylated alcohols, sulphosuccinates, alkane sulphonates, phosphate esters, alkyl isethionates, alkyl taurates and/or alkyl sarcosinates. Suitable cationic organic surfactants include alkylamine salts, quaternary ammonium salts, sulphonium salts and phosphonium salts. Suitable nonionic surfactants include silicones such as those described as Surfactants 1-6 in EP 638346, particularly siloxane polyoxyalkylene copolymers, condensates of ethylene oxide with a long chain (fatty) alcohol or (fatty) acid, for example $C_{14-15}$ alcohol, condensed with 7 moles of ethylene oxide (Dobanol® 45-7), condensates of ethylene oxide with an amine or an amide, condensation products of ethylene and propylene oxides, esters of glycerol, sucrose or sorbitol, fatty acid alkylol amides, sucrose esters, fluoro-surfactants and fatty amine oxides. Suitable amphoteric organic detergent surfactants include imidazoline compounds, alkylaminoacid salts and betaines. It is more preferred that the organic surfactants are nonionic or anionic materials. Of particular interest are surfactants which are environmentally acceptable. The concentration of anti-foam in an emulsion may vary according to applications, required viscosity, effectiveness of the anti-foam and addition system, and ranges on average from 5 to 80% by weight, preferably 10 to 40%. A foam control emulsion may also contain a stabilising agent such as a silicone glycol copolymer or a crosslinked organopolysiloxane polymer having at least one polyoxyalkylene group, as described in EP663225.

Alternatively the anti-foam can be provided as a water-dispersible composition in which (A), (B) and (C) are dispersed in a water-dispersible carrier such as a silicone glycol or in another water-miscible liquid such as ethylene glycol, propylene glycol, polypropylene glycol, polyethylene glycol, a copolymer of ethylene and propylene glycols, a condensate of a polyalkylene glycol with a polyol, an alkyl polyglycoside, an alcohol alkoxylate or an alkylphenol alkoxylate or in a mineral oil as described in U.S. Pat. No. 5,908,891.

In one embodiment, the silicone anti-foam is a "non fabric substantive agent" meaning that the anti-foam does not deposit on textiles during a laundering cycle. Such lack of deposition is important to avoiding spotting. In one embodiment, the silicone anti-foam passes the spotting test outlined in PCT Application WO 05/111186 A1 to The Procter & Gamble Company.

In one embodiment, the anti-foam is selected from crosslinked alkoxylated silicone polymer substituents combined with a polyether, a dimethicone, and a primary filler.

Particularly preferred are silicone anti-foam compounds consisting of crosslinked alkoxylated silicone polymer substituents combined with polyether and modified silica as described in Global Patent Application 2016 WO2016/101568 A1 to Jiangsu Sixn Scientific Technological Application Research Institute.

Structurant

The detergent compositions herein comprise from about 0.01% to about 2.5%, by weight of the composition, of a structurant.

Structurants useful herein include internal structurants, external structurants, and mixtures thereof. As used herein, the term "external structurant" refers to a selected compound or mixture of compounds which provide either a sufficient yield stress or low shear viscosity to stabilize the fluid laundry detergent composition independently from, or extrinsic from, any structuring effect of the detersive surfactants of the composition. By "internal structurant" it is meant that the detergent surfactants, which form a major class of laundering ingredients, are relied on for providing the necessary yield stress or low shear viscosity.

External Structurants

External structurants useful herein include those that are naturally derived and/or synthetic polymeric structurants; crystalline, hydroxyl-containing structurants; and mixtures thereof.

Examples of naturally derived polymeric structurants of use in the present invention include: microfibrillated cellulose, hydroxyethyl cellulose, hydrophobically modified hydroxyethyl cellulose, carboxymethyl cellulose, polysaccharide derivatives and mixtures thereof. Non-limiting examples of microfibrillated cellulose are described in WO 2009/101545 A1. Suitable polysaccharide derivatives include: pectine, alginate, arabinogalactan (gum Arabic), carrageenan, gellan gum, xanthan gum, guar gum and mixtures thereof.

Examples of synthetic polymeric structurants of use in the present invention include: polycarboxylates, polyacrylates, hydrophobically modified ethoxylated urethanes, hydrophobically modified non-ionic polyols and mixtures thereof.

In one embodiment, the polycarboxylate polymer is a polyacrylate, polymethacrylate or mixtures thereof. In another embodiment, the polyacrylate is a copolymer of unsaturated mono- or di-carbonic acid and 1-30C alkyl ester of the (meth)acrylic acid. Such copolymers are available from Noveon, Inc under the tradename CARBOPOL AQUA 30.

External structurants useful herein also include crystalline, hydroxyl-containing structurants such as those described in more detail in U.S. Pat. No. 6,855,680 B2 in the name of The Procter & Gamble Company. Such structurants are described as crystalline, hydroxyl-containing stabilizing agents that can be fatty acid, fatty ester or fatty soap water-insoluble wax-like substance.

The crystalline, hydroxyl-containing stabilizing agents may be derivatives of castor oil, especially hydrogenated castor oil derivatives. For example, castor wax. The crystalline, hydroxyl-containing agent typically is selected from the group consisting of:

i)

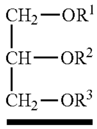

wherein:

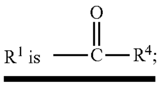

$R^2$ is $R^1$ or H;

$R^3$ is $R^1$ or H;

$R^4$ is independently $C_{10}$-$C_{22}$ alkyl or alkenyl comprising at least one hydroxyl group;

ii)

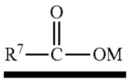

wherein:

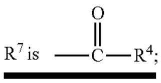

$R^4$ is as defined above in i);

M is $Na^+$, $K^+$, $Mg^{++}$ or $Al^{3+}$, or H; and iii) mixtures thereof.

Alternatively, the crystalline, hydroxyl-containing stabilizing agent may have the formula:

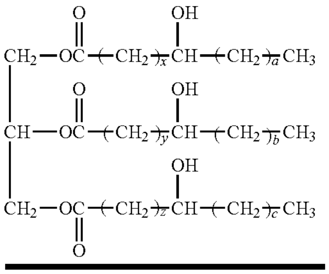

wherein:

(x+a) is from between 11 and 17; (y+b) is from between 11 and 17; and (z+c) is from between 11 and 17. Preferably, wherein x=y=z=10 and/or wherein a=b=c=5.

Commercially available crystalline, hydroxyl-containing stabilizing agents include THIXCIN® from Rheox, Inc.

In addition to THIXCIN®, alternative materials that are suitable for use as crystalline, hydroxyl-containing stabilizing agents include, but are not limited to, compounds of the formula:

Z—(CH(OH))a-Z' where a is from 2 to 4, preferably 2; Z and Z' are hydrophobic groups, especially selected from C6-C20 alkyl or cycloalkyl, C6-C24 alkaryl or aralkyl, C6-C20 aryl or mixtures thereof. Optionally Z can contain one or more nonpolar oxygen atoms as in ethers or esters.

A nonlimiting example of such alternative materials is 1,4-di-O-benzyl-D-Threitol in the R, R, and S,S forms and any mixtures, optically active or not.

Examples of external structurants also include polymer gums, e.g. xanthan gum or other gum capable of forming stable continuous gum networks which can suspend particles.

Internal

As used herein, "internal structurant" refers to the use of selected elements of the formulation to form the internal structure of the composition. Such internally structured liquid laundry detergent or gel compositions may comprise a soap or fatty acid in combination with sodium sulphate and one or more surfactants inclusive of alkylpolyethoxysulfates may be used to form a gelled structure by the formation of lamellar phases.

The composition may also comprise lamellar phase dispersions from micellar surfactant systems, and additionally an external structurant for promoting formation of the lamellar phase, whereby said structurant may be a fatty alcohol such as decanol or dodecanol. Such compositions are sometimes referred to as gel network detergent compositions.

Laundry Adjuncts

The detergent compositions herein may include from about 0.01% to about 10.0%, by weight of the composition, of a laundry adjunct. Any conventional laundry detergent ingredients may be used. Examples of laundry adjuncts useful herein include: enzymes, enzymes stabilizers, optical brighteners, particulate material, hydrotropes, perfume and other odor control agents, soil suspending polymers and/or soil release polymers, suds suppressors, fabric care benefits, pH adjusting agents, dye transfer inhibiting agents, preservatives, hueing dyes, non-fabric substantive dyes, encapsulated actives (such as perfume microcapsules or encapsulated bleach), and mixtures thereof.

In one embodiment, the detergent compositions herein comprise perfume microcapsules. In one embodiment, the detergent compositions herein comprise a hueing dye.

Some of these laundry adjuncts are described in greater detail as follows:

Enzymes

The detergent compositions herein may comprise one or more detersive enzymes which provide cleaning performance and/or fabric care benefits. Examples of suitable enzymes include, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and known amylases, or combinations thereof. A preferred enzyme combination comprises a cocktail of conventional detersive enzymes such as protease, lipase, cutinase and/or cellulase in conjunction with amylase. Detersive enzymes are described in greater detail in U.S. Pat. No. 6,579,839.

Enzyme Stabilizers

Enzymes can be stabilized using any known stabilizer system such as calcium and/or magnesium compounds, boron compounds and substituted boric acids, aromatic borate esters, peptides and peptide derivatives, polyols, low molecular weight carboxylates, relatively hydrophobic organic compounds [e.g. certain esters, diakyl glycol ethers, alcohols or alcohol alkoxylates], alkyl ether carboxylate in addition to a calcium ion source, benzamidine hypochlorite, lower aliphatic alcohols and carboxylic acids, N,N-bis(carboxymethyl) scrine salts; (meth)acrylic acid-(meth)acrylic acid ester copolymer and PEG; lignin compound, polyamide oligomer, glycolic acid or its salts; poly hexa methylene bi guanide or N,N-bis-3-amino-propyl-dodecyl amine or salt; and mixtures thereof.

Optical Brighteners

Also known as fluorescent whitening agents for textiles are useful laundering adjuncts in fluid laundry detergent compositions of the present invention. Suitable use levels are from 0.001% to 1% by weight of the fluid laundry detergent composition. Brighteners are for example disclosed in EP 686691B and include hydrophobic as well as hydrophilic types. Brightener 49 and Brightener 15 are preferred for use herein.

Fabric Shading Agents

Hueing dyes, shading dyes, hueing agents, and leuco dyes are useful laundering adjuncts in fluid laundry detergent compositions as fabric shading agents. The history of these materials in laundering is a long one, originating with the use of "laundry bluing agents" many years ago. More recent developments include the use of sulfonated phthalocyanine dyes having a Zinc or aluminium central atom; and still more recently a great variety of other blue and/or violet dyes have been used for their hueing or shading effects. See for example WO 2009/087524 A1, WO2009/087034A1 and references therein.

Fabric shading leading in some cases to whiteness improvements can be accomplished through application of leuco dyes via use of a single compound or a leuco composition comprising at least one leuco compound comprising any suitable leuco moiety. In one aspect, the leuco moiety is selected from the group consisting diarylmethane leuco moieties, triarylmethane leuco moieties, oxazine moieties, thiazine moieties, hydroquinone moieties, and arylaminophenol moieties. The leuco compound may comprise a leuco moiety and an alkyleneoxy moiety covalently bound to the leuco moiety, wherein the alkyleneoxy moiety comprises at least one ethylene oxide group, preferably the alkylene oxide moiety also comprises at least one propylene oxide group. In one aspect, preferred leuco compounds include those conforming to the structure of Formula (CVIII), (CVIII)

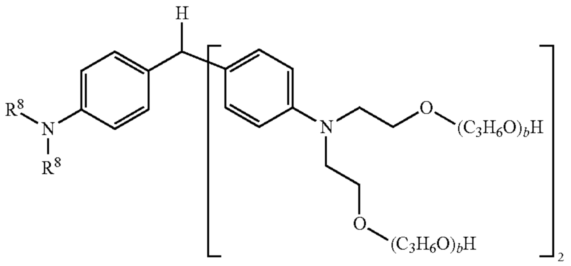

wherein $R^8$ is H or $CH_3$ and each index b is independently on average about 1 to 2. Other suitable leuco dyes are disclosed in U.S. Pat. Nos. 10,377,976, 10,377,977, 10,351,709, 10,385,294, 10,472,595, 10,479,961, 10,501,633, 10,577,570, 10,590,275, 10,633,618, 10,647,854, and 10,676,699, incorporated in their entirety herein by reference.

The leuco composition of the invention can comprise other compounds in addition to leuco compound(s), antioxidant compound(s), and solvents(s). For example, the leuco composition can contain up to about 2 wt. % salts such as sodium chloride or sodium sulfate, unreacted starting materials used in making the leuco compound(s), impurities resulting from side reactions of those starting materials, and degradation products of the leuco compounds or such impurities. Specific non-limiting examples of such materials include compounds of Formula (DI)-(DV)

(DI)

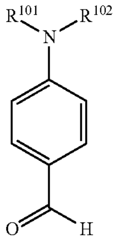

(DII)

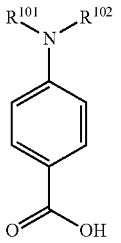

(DIII)

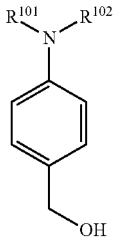

(DIV)

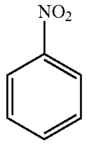

(DV)

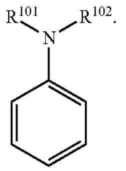

In the structures of Formula (DI)-(DV), $R^{101}$ and $R^{102}$ are independently selected from the group consisting of hydrogen, alkyl (e.g., methyl), and oxyalkylene groups. The oxyalkylene groups can contain any suitable number of oxyalkylene repeat units (e.g., ethylene oxide and/or propylene oxide), such as the ranges disclosed above for the leuco compounds present in the leuco composition. Such oxyalkylene groups for $R^{101}$ and $R^{102}$ can be independently terminated with a member selected from the group consisting of hydrogen, $CH{=}CH_2$, $-CH_2-CH{=}CH_2$, $-CH{=}CH-CH_3$, $-CH_2-CHO$, $-CH(CH_3)-CHO$, $-CH_2-CO-CH_3$, $-CH_2-COOH$, $-CH(CH_3)-COOH$, $-CH_2-CH_2Cl$, $-CHCl-CH_3$, $-CH_2-CH_2-CH_2Cl$, $-CH_2-CHCl-CH_3$, and $-CHCl-CH_2-CH_3$. Further, the groups $R^{101}$ and $R^{102}$ can be combined to form a group having the structure $-CH_2CH_2-O-CH_2CH_2-$, which together with the nitrogen atom forms a morpholine ring. Other compounds that may be present in the leuco composition include compounds of Formula (DVI)-(DIX)

(DVI)

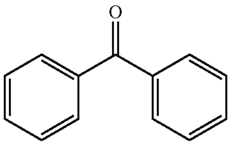

(DVII)

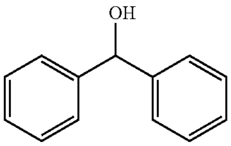

(DVIII)

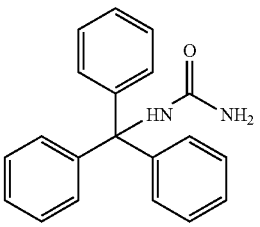

(DIX)

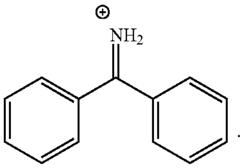

Each aryl moiety of the compounds of Formula (DVI)-(DIX) can be independently unsubstituted or substituted, typically in the para position, with a nitro group or a group having the structure $-NR^{101}R^{102}$, with $R^{101}$ and $R^{102}$ being independently selected from the group described above. Additional compounds that can be present in the leuco composition include phenols and amino phenols containing, typically in the para position relative to the hydroxy group, a group having the structure $-NR^{101}R^{102}$, with $R^{101}$ and $R^{102}$ being independently selected from the group described above. The leuco composition can also contain compounds of Formula (DX) and (DXI)

(DX)

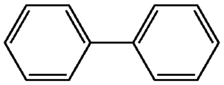

(DXI)

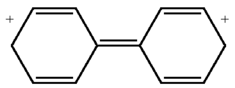

In the structures of (DX) and (DXI), the aryl moieties and the cyclohexadienyl moieties can be unsubstituted or substituted, typically in the para position, with a nitro group or a group having the structure $-NR^{101}R^{102}$, with $R^{101}$ and $R^{102}$ being independently selected from the group described above. The leuco composition can also contain condensation products of some of the compounds described above, such as a compound of Formula (DXII)

(DXII)

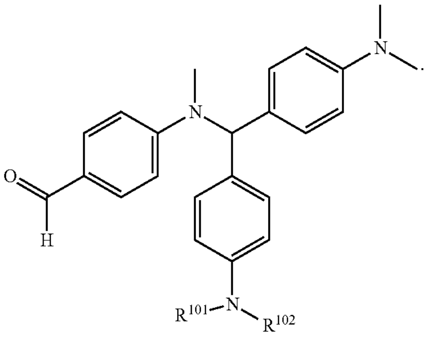

As noted above, the leuco composition can also contain the colored (e.g., oxidized) form of the leuco compound(s) present in the composition. In the case of triarylmethane leuco colorants, the oxidized form of the triarylmethane leuco colorant (which contains a central carbocation) can form an adduct with anions present in the leuco composition, such as the anions described above as suitable charge-balancing counterions for the leuco compound(s).

The unreacted starting materials and impurities described above can be present in the leuco composition in any suitable amount. Preferably, these materials and impurities are present in the leuco composition in a relatively minor amount which does not adversely affect the performance of the leuco colorant(s) to any material degree. Excluding inorganic salts, unreacted starting materials and water, in a preferred embodiment such impurities will be present at less than 10 wt %, preferably less than 5 wt % and more preferably less than 2 wt % relative to the active leuco compound.

The fluid laundry detergent compositions herein typically comprise from 0.00003 wt % to 0.1 wt %, from 0.00008 wt % to 0.05 wt %, or even from 0.0001 wt % to 0.04 wt %, fabric shading agent.

Particulate Material

The fluid laundry detergent composition may include particulate material such as clays, suds suppressors, encapsulated sensitive ingredients, e.g., perfumes, bleaches and enzymes in encapsulated form; or aesthetic adjuncts such as pearlescent agents, pigment particles, mica or the like. Suitable use levels are from 0.0001% to 5%, or from 0.1% to 1% by weight of the fluid laundry detergent composition.

Perfume and Odour Control Agents

In one embodiment, the detergent compositions herein comprise a perfume. If present, perfume is typically incorporated in the present compositions at a level from 0.001 to 10%, preferably from 0.01% to 5%, more preferably from 0.1% to 3% by weight of the composition. In one embodiment, the perfume of the detergent composition of the present invention comprises one or more enduring perfume ingredient that has a boiling point of 250° C. or higher and a ClogP of 3.0 or higher, more preferably at a level of at least 25%, by weight of the perfume. Suitable perfumes, perfume ingredients, and perfume carriers are described in U.S. Pat. No. 5,500,138; and US 20020035053 A1.

In another embodiment, the perfume comprises a perfume microcapsule and/or a perfume nanocapsule. Suitable perfume microcapsules and perfume nanocapsules include those described in the following references: US2003215417 A1; US2003216488 A1; US2003158344 A1; US 2003165692 A1; US2004071742 A1; US2004071746 A1; US2004072719 A1; US2004072720 A1; EP 1393706 A1; US2003203829 A1; US2003195133 A1; US2004087477 A1; US 20040106536 A1; U.S. Pat. Nos. 6,645,479; 6,200,949; 4,882,220; 4,917,920; 4,514,461; US RE 32713; U.S. Pat. No. 4,234,627.

In yet another embodiment, the detergent composition comprises odor control agents such as described in U.S. Pat. No. 5,942,217: "Uncomplexed cyclodextrin compositions for odor control", granted Aug. 24, 1999. Other agents suitable odor control agents include those described in: U.S. Pat. Nos. 5,968,404, 5,955,093; 6,106,738; 5,942,217; and 6,033,679.

Hydrotropes

The detergent compositions herein optionally comprise a hydrotrope in an effective amount, such as, for example, from 0% to 15%, from 1% to 10%, from 3% to 6% by weight of the composition, so that the fluid laundry detergent compositions are compatible in water. Suitable hydrotropes for use herein include anionic-type hydrotropes, particularly sodium, potassium, and ammonium xylene sulfonate, sodium, potassium and ammonium toluene sulfonate, sodium potassium, sodium cumene sulfonate, and ammonium cumene sulfonate, and mixtures thereof, as disclosed in U.S. Pat. No. 3,915,903.

Polymers

The composition may comprise one or more polymers. Non-limiting examples, all of which may be optionally modified, include polyethyleneimines, carboxymethylcellulose, poly(vinyl-pyrrolidone), poly(ethylene glycol), poly (vinyl alcohol), poly(vinylpyridine-N-oxide), poly(vinylimidazole), polycarboxylates or alkoxylated substituted phenols (ASP). as described in WO 2016/041676. An example of ASP dispersants, include but are not limited to, Hostapal Bv Conc S1000, available from Clariant.

Polyamines may be used for grease, particulate removal or stain removal. A wide variety of amines and polyaklyeneimines can be alkoxylated to various degrees to achieve hydrophobic or hydrophilic cleaning. Such compounds may include, but are not limited to, ethoxylated polyethyleneimine, ethoxylated hexamethylene diamine, and sulfated versions thereof. Useful examples of such polymers are HP20 available from BASF or a polymer having the following general structure:

$bis((C_2H_5O)_n)(C_2H_4O)_n)(CH_3)—N+—C_xH_{2x}—N+—(CH_3)-bis((C_2H_5O)(C_2H_4O)_n)$, wherein n=from 20 to 30, and x=from 3 to 8, or sulphated or sulphonated variants thereof. Polypropoxylated-polyethoxylated amphiphilic polyethyleneimine derivatives may also be included to achieve greater grease removal and emulsification. These may comprise alkoxylated polyalkylenimines, preferably having an inner polyethylene oxide block and an outer polypropylene oxide block. Detergent compositions may also contain unmodified polyethyleneimines useful for enhanced beverage stain removal. PEI's of various molecular weight are commercially available from the BASF Corporation under the trade name Lupasol®. Examples of suitable PEI's include, but are not limited to, Lupasol FG®, Lupasol G-35®.

Preferred amphiphilic graft co-polymer(s) comprise (i) polyethyelene glycol backbone; and (ii) at least one pendant moiety selected from polyvinyl acetate, polyvinyl alcohol and mixtures thereof. An example of an amphiphilic graft co-polymer is Sokalan HP22, supplied from BASF.

Preferably the composition comprises one or more soil release polymers. Suitable soil release polymers are polyester soil release polymers such as Repel-o-tex polymers, including Repel-o-tex SF, SF-2 and SRP6 supplied by Rhodia. Other suitable soil release polymers include Texcare polymers, including Texcare SRA100, SRA300, SRN100, SRN170, SRN240, SRN260 SRN300 and SRN325 supplied by Clariant. Other suitable soil release polymers are Marloquest polymers, such as Marloquest SL, HSCB, L235M, B, G82 supplied by Sasol. Other suitable soil release polymers include methyl-capped ethoxylated propoxylated soil release polymers as described in U.S. Pat. No. 9,365,806.

Preferably the composition comprises one or more polysaccharides which may in particular be chosen from carboxymethyl cellulose, methylcarboxymethylcellulose, sulfoethylcellulose, methylhydroxyethylcellulose, carboxymethyl xyloglucan, carboxymethyl xylan, sulfoethylgalactomannan, carboxymethyl galactomannan, hydoxyethyl galactomannan, sulfoethyl starch, carboxymethyl starch, and mixture thereof. Other polysaccharides suitable for use in the present invention are the glucans. Preferred glucans are Poly alpha-1,3-glucan which is a polymer comprising glucose monomeric units linked together by glycosidic linkages (i.e., glucosidic linkages), wherein at least about 50% of the glycosidic linkages are alpha-1,3-glycosidic linkages. Poly alpha-1,3-glucan is a type of polysaccharide. Poly alpha-1,3-glucan can be enzymatically produced from sucrose using one or more glucosyltransferase enzymes, such as described in U.S. Pat. No. 7,000,000, and U.S. Patent Appl. Publ. Nos. 2013/0244288 and 2013/0244287 (all of which are incorporated herein by reference), for example.

Other suitable polysaccharides for use in the composition are cationic polysaccharides. Examples of cationic polysaccharides include cationic guar gum derivatives, quaternary nitrogen-containing cellulose ethers, and synthetic polymers that are copolymers of etherified cellulose, guar and starch. When used, the cationic polymers herein are either soluble in the composition or are soluble in a complex coacervate phase in the composition formed by the cationic polymer and the anionic, amphoteric and/or zwitterionic surfactant component described hereinbefore. Suitable cationic polymers are described in U.S. Pat. Nos. 3,962,418; 3,958,581; and U.S. Publication No. 2007/0207109A1.

Additional Amines

Polyamines are known to improve grease removal. Preferred cyclic and linear amines for performance are 1,3-bis (methylamine)-cyclohexane, 4-methylcyclohexane-1,3-diamine (Baxxodur ECX 210 supplied by BASF) 1,3 propane diamine, 1,6 hexane diamine, 1,3 pentane diamine (Dytek EP supplied by Invista), 2-methyl 1,5 pentane diamine (Dytek A supplied by Invista). U.S. Pat. No. 6,710,023 discloses hand dishwashing compositions containing said diamines and polyamines containing at least 3 protonable amines. Polyamines according to the invention have at least one pka above the wash pH and at least two pka's greater than about 6 and below the wash pH. Preferred polyamines with are selected from the group consisting of diethylenetriamine, tetraethylenepentamine, hexaethylhexamine, heptaethylheptamines, octaethyloctamines, nonethylnonamines, and mixtures thereof commercially available from Dow, BASF and Huntman. Especially preferred polyetheramines are lipophilic modified as described in U.S. Pat. Nos. 9,752,101, 9,487,739, 9,631,163

Unit Dose Detergent

In some embodiments of the present invention, the fluid laundry detergent compositions are enclosed in a water soluble film material, such as a polyvinyl alcohol, to form a unit dose pouch. In some embodiments, the unit dose pouch comprises a single or multi-compartment pouch where the fluid laundry detergent composition of the present invention can be used in conjunction with any other conventional powder or liquid detergent composition. Examples of suitable pouches and water soluble film materials are provided in U.S. Pat. Nos. 6,881,713, 6,815,410, and 7,125,828.

Method of Treating Fabrics/Textiles and Uses of Detergent Compositions

The detergent compositions herein may be used to treat a textile garment, such as clothing or other household textiles (sheets, towels, and the like).

Also contemplated herein is a method of treating a substrate by contacting a substrate with the detergent composition disclosed herein. As used herein, "detergent compositions" include fabric treatment compositions and liquid laundry detergent compositions for handwash, machine wash and other purposes including fabric care additive compositions and compositions suitable for use in the soaking and/or pretreatment of stained fabrics. Consumer and industrial usage is contemplated.

If used as a laundry detergent product, the compositions can be used to form aqueous washing liquor containing from 500 ppm to 5,000 ppm of the detergent composition.

In one embodiment, the detergent compositions may be used in a domestic method for treating a textile garment with an aqueous liquid detergent composition, the method comprising the steps of:

a) treating a textile with an aqueous solution comprising a mixture of water and the detergent composition in relative amounts such that the aqueous solution comprises from about 0.01 g/L to about 1 g/L of an linear alkyl benzyne sulfonate surfactant and from about 0.1 mg/L to about 100 mg/L of a silicone anti-foam;

and b) rinsing and drying the textile;

wherein the aqueous liquid detergent composition comprises from about 1% to about 60% surfactant, by weight of the composition, of a surfactant system wherein said surfactant system comprises:

i) linear alkylbenzene sulfonate;

ii) between 1% and 30% by weight of alkyl ethoxylated sulfate surfactant;

b) from about 0.001% to about 4.0%, by weight of the composition, of an anti-foam selected from organo-modified silicone polymers with aryl or alkylaryl substituents combined with silicone resin and a primary filler, which is modified silica;

c) from about 0.01% to about 2.5%, by weight of the composition, of a structurant;

wherein the ratio of linear alkylbenzene sulfonate to alkyl ethoxylated sulfate surfactant is between 1.1:1 to 10:1.

Comparative Examples

TABLE 1

| Ingredient | Example A comparative Wt % | Example B comparative Wt % |
|---|---|---|
| AES[3] | 9.1% | 13.5% |
| linear alkylbenzene sulfonate | 7.5% | 10.9% |
| amine oxide | 0.4% | 0.8% |
| alkyl ethoxylate (EO7) | 4.5% | 1.8% |
| citric acid | 1.8% | 2.7% |
| Protease, stock 7.83% active | 0.89% | 1.0% |
| Amylase, stock 2.93% active | 0.23% | 0.5% |
| Cellulase, stock as 1.163% active | 0% | 0.1% |
| Mananase, stock as 2.5% active | 0.06% | 0.12% |

TABLE 1-continued

| | Example | |
|---|---|---|
| Ingredient | A comparative Wt % | B comparative Wt % |
| Pectinase, stock as 2% active | 0% | 0.15% |
| borax | 1.1% | 1.7% |
| calcium & sodium formate | 0.1% | 0.2% |
| amine ethoxylate polymers | 2.6% | 2.4% |
| DTPA | 0.5% | 0.7% |
| fluorescent whitening agents | 0.2% | 0.4% |
| ethanol | 1.2% | 1.7% |
| propylene glycol | 3.4% | 5.8% |
| ethanolamine | 2.5% | 3.6% |
| NaOH | 0.1% | 0.2% |
| NaCS | 0.8% | 1.2% |
| structurant[1] | 0.1% | 0.1% |
| dye | 0.01% | 0.01% |
| perfume | 0.6% | 0.6% |
| silicone antifoam[2] | 0.2% | 0.2% |
| Hueing dye | 0.03% | 0.04% |
| water & miscellaneous | To 100% | To 100% |

Examples C-D

Detergent Compositions According to the Invention

TABLE 2

| | Example | |
|---|---|---|
| Ingredient | C Wt % | D Wt % |
| AES[3] | 4.0-8.0% | 5.8-7.7% |
| linear alkylbenzene sulfonate | 8.5-14.0% | 10.6-13.9% |
| amine oxide | 0-0.75% | 0-0.6% |
| alkyl ethoxylate (EO7) | 3.0-12.5% | 6.8-9.5% |
| citric acid | 1.0-2.5% | 1.6-2.1% |
| palm kernel fatty acid | 0.0-0.5 | 0.3-0.4 |
| Protease, stock 7.83% active | 0.6-1.5% | 0.8-1.0% |
| Amylase, stock 2.93% active | 0.1-0.5% | 0.2-0.5% |
| Cellulase, stock as 1.163% active | 0-0.1% | 0-0.1% |
| Mananase, stock as 2.5% active | 0-0.12% | 0.06-0.12% |
| Pectinase, stock as 2% active | 0-0.15% | 0-0.15% |
| borax | 0.5-2.0% | 1.2-1.6% |
| calcium & sodium formate | 0.1-0.3% | 0.1-0.2% |
| amine ethoxylate polymers | 2.0-4.0% | 2.8-3.1% |
| DTPA | 0.3-0.7% | 0.4-0.6% |
| fluorescent whitening agents | 0.05-0.5% | 0.1-0.4% |
| ethanol | 1.0-2.5% | 1.6-2.1% |
| propylene glycol | 1.5-4.5% | 2.0-4.1% |
| ethanolamine | 1.5-3.5% | 2.5-3.3% |
| NaOH | 0.1-0.7% | 0.4-0.6% |
| NaCS | 0.5-2.0% | 1.2-1.6% |
| structurant[1] | 0.1-0.25% | 0.1% |
| dye | 0.01-0.02% | 0.01% |
| perfume | 0.4-1.4% | 0.6% |
| Perfume microcapsules | 0-0.4% | 0% |
| silicone antifoam[2] | 0.1-0.3% | 0.2% |
| Hueing dye | 0.0-0.04% | 0.03-0.04% |
| water & miscellaneous | To 100% | To 100% |

[1]Hydrogenated Castor Oil prepared as described U.S. Pat. No. 6,855,680 B2

[2]Dow Corning supplied antifoam blend of: 80-92% ethylmethyl, methyl(2-phenylpropyl) siloxane; 5-14% MQ Resin in octyl stearate; and 3-7% modified silica; prepared as described in U.S. Pat. No. 6,521,586

[3]C12-C15 EO2.5S Alklyethoxy Sulfate where the alkyl portion of the AES includes from about 13.9 to about 14.6, carbon atoms.

As disclosed above, Examples A and B are comparative examples. Example C serves to disclose some potential ranges contemplated by the disclosure. Example D illustrates a narrower range within Example C wherein at least one formula was tested for comparison with the comparative examples A and B.

As shown in the tables above and the data below, it has now surprisingly been found that, unlike previous formulations that had a AES to LAS ratio of 1.5 to 1 or greater, one can provide acceptable cleaning, odor and suds regulation in HE domestic washing machines by utilizing a ratio of LAS to AES surfactant of greater than 1.1 and a nonionic surfactant in combination with a select highly efficient silicone antifoam compound. Additionally, unlike the prior disclosures, it has now been found that, by properly balancing the ratio between LAS and AES in conjunction to nonionic surfactants, one can create a surfactant system utilizing less than 30% AES, with more LAS than AES, that is capable of cleaning as well as prior formulations and still controls suds in an HE front loading machine.

Suds Test

HE in-use suds formation observation in a Whirlpool Duet HT high efficiency front loading automatic washers is carried out by dosing 48 g of formulas A and D and 59 g of formulas B and D, each in turn, and running a normal wash cycle (separate cycles for each sample) with clean ballast using 70° F., 0 grain/gallon hardness water while monitoring the length of the wash cycle and suds quantity using a picture grading scale. Results show that Formula A, Formula D dosed at 48 g, Formula B and Formula D dosed at 59 g do not cause a manufacturer-created machine suds lock to be triggered due to oversudsing, resulting in an undesirable automatic extension in the length of time for the wash cycle or increased water consumption.

Therefore the select surfactant and silicone antifoam combination of the present invention enables such as that of Example D shows the desired suds profiles in HE machines.

A. An aqueous liquid detergent composition having suds compatibility and improved cleaning, said composition comprising:

a) from about 1% to about 60%, by weight of the composition, of a surfactant system wherein said surfactant system comprises:

i) linear alkylbenzene sulfonate;

ii) between 1% and 30% by weight of alkyl ethoxylated sulfate surfactant;

b) from about 0.001% to about 4.0%, by weight of the composition, of an anti-foam selected from organomodified silicone polymers with aryl or alkylaryl substituents combined with silicone resin and a primary filler, which is modified silica;

c) from about 0.01% to about 2.5%, by weight of the composition, of a structurant, wherein the structurant is selected from: crystalline, hydroxyl-containing stabilizers, polymer gums, and mixtures thereof;

wherein the ratio of linear alkylbenzene sulfonate to alkyl ethoxylated sulfate surfactant is between 1.1:1 to 10:1.

B. The aqueous liquid detergent composition of paragraph A, wherein the ratio of linear alkylbenzene sulfonate to alkyl ethoxylated sulfate surfactant is between 1.2:1 to 5:1.

C. The aqueous liquid detergent composition of any of the preceding paragraphs, wherein the composition further comprises amine oxide.

D. The aqueous liquid detergent composition of any of the preceding paragraphs, wherein the surfactant system further comprises an additional surfactant selected from the group consisting of anionic surfactants, cationic surfactants, zwitterionic surfactants, and mixtures thereof.

E. The aqueous liquid detergent composition of any of the preceding paragraphs, wherein the anti-foam is selected from:

a) mixtures of from about 80 to about 92% ethylmethyl, methyl (2-phenylpropyl) siloxane; from about 5 to about 14% MQ resin in octyl stearate; and from about 3 to about 7% modified silica;

b) mixtures of from about 78 to about 92% ethylmethyl, methyl (2-phenylpropyl) siloxane; from about 3 to about 10% MQ resin in octyl stearate; from about 4 to about 12% modified silica; and c) mixtures thereof, wherein percentages are by weight of the anti-foam.

F. The aqueous liquid detergent composition of any of the preceding paragraphs, wherein the surfactant system comprises from about 30% to about 75% by weight of LAS.

G. The aqueous liquid detergent composition of any of the preceding paragraphs, wherein the surfactant system comprises between 10% to 50% by weight of nonionic surfactant, preferably between 2% and 20% by weight of nonionic surfactant.

H. The aqueous liquid detergent composition of any of the preceding paragraphs, wherein the composition comprises between 0.01 and 0.2 of the silicone anti-foam.

I. The aqueous liquid detergent composition of any of the preceding paragraphs, wherein the composition comprises from about 15% to about 35%, by weight of the composition, of the surfactant system.

J. The aqueous liquid detergent composition of any of the preceding paragraphs, wherein the composition comprises from about 0.01% to about 2.0%, by weight of the composition, of the silicone anti-foam.

K. The aqueous liquid detergent composition of any of the preceding paragraphs, wherein the surfactant system comprises between 2% and 20% weight of the surfactant system, of nonionic surfactant.

L. The aqueous liquid detergent composition of any of the preceding paragraphs, wherein the composition further comprises from about 0.02% to about 10.0%, by weight of the composition, of a laundry adjunct selected from the group consisting of enzymes, enzymes stabilizers, optical brighteners, particulate material, hydrotropes, perfume and other odour control agents, soil suspending polymers and/or soil release polymers, fabric care benefits, pH adjusting agents, dye transfer inhibiting agents, preservatives, hueing dyes, non-fabric substantive dyes, encapsulated actives, and mixtures thereof.

M. The aqueous liquid detergent composition of any of the preceding paragraphs, wherein the composition further comprises perfume microcapsules, a hueing dye, or a mixture thereof.

N. A domestic method of treating a textile garment with an aqueous liquid detergent composition, the method comprising the steps of:

a) treating a textile with an aqueous solution comprising a mixture of water and the detergent composition of any of the preceding paragraphs in relative amounts such that the aqueous solution comprises from about 0.01 g/L to about 1 g/L of an linear alkylbenzene sulfonate surfactant and from about 0.1 mg/L to about 100 mg/L of a silicon anti-foam; and b) rinsing and drying the textile.

O. The aqueous liquid detergent composition of any of the preceding paragraphs, wherein the alkyl portion of the alkyl ethoxylated sulfate surfactant (AES) includes, on average, from 13.7 to about 16 carbon atoms distribution, more preferably from 13.9 to about 14.6 carbon atoms distribution.

P. The aqueous liquid detergent composition of any of the preceding paragraphs, wherein the surfactant system comprises less than 30% by weight of the surfactant system, of alkyl ethoxylated sulfate surfactant, preferably between 2% and 10% by weight of the surfactant system, of alkyl ethoxylated sulfate surfactant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An aqueous liquid detergent composition, said composition comprising:

a) from about 5% to about 60%, by weight of the composition, of a surfactant system wherein said surfactant system comprises:

i) from about 40% to about 60% by weight of the surfactant system, of linear alkylbenzene sulfonate;

ii) between 5% and 25% by weight of the surfactant system, of alkyl ethoxylated sulfate surfactant;

iii) between 10% to 50% by weight of the surfactant system, of nonionic surfactant;

b) from about 0.01% to about 0.3%, by weight of the composition, of an anti-foam selected from organo-modified silicone polymers with aryl or alkylaryl substituents combined with silicone resin and a primary filler, which is modified silica;

c) from about 0.01% to about 2.5%, by weight of the composition, of a structurant, wherein the structurant is selected from: crystalline, hydroxyl-containing stabilizers, polymer gums, and mixtures thereof;

d) from about 40% to about 90%, by weight of the composition, of water;

wherein the ratio of linear alkylbenzene sulfonate to alkyl ethoxylated sulfate surfactant is between 1.1:1 to 10:1 and the composition has a viscosity of about 100 mPa*s to about 1000 mPa*s when measured at a sheer rate of 20 $s^{-1}$ and 20° C.

2. The aqueous liquid detergent composition of claim 1, wherein the ratio of linear alkylbenzene sulfonate to alkyl ethoxylated sulfate surfactant is between 1.2:1 to 5:1.

3. The aqueous liquid detergent composition of claim 1, wherein the composition further comprises amine oxide.

4. The aqueous liquid detergent composition of claim 1 wherein the anti-foam is selected from:

a) mixtures of from about 80 to about 92% ethylmethyl, methyl (2-phenylpropyl) siloxane;

from about 5 to about 14% an organopolysiloxane resin consisting essentially of $R^3{}_3SiO_{1/2}$ and $SiO_{4/2}$ units in octyl stearate, where $R^3$ comprises optionally substituted hydrocarbon radicals having 1 to 30 carbon atoms; and from about 3 to about 7% modified silica;

b) mixtures of from about 78 to about 92% ethylmethyl, methyl (2-phenylpropyl) siloxane; from about 3 to about 10% an organopolysiloxane resin consisting essentially of $R^3{}_3SiO_{1/2}$ and $SiO_{4/2}$ units in octyl stearate, where $R^3$ comprises optionally substituted hydrocarbon radicals having 1 to 30 carbon atoms; from about 4 to about 12% modified silica; and c) mixtures thereof;

wherein percentages are by weight of the anti-foam.

5. The aqueous liquid detergent composition of claim 1, wherein the composition comprises from about 15% to about 35%, by weight of the composition, of the surfactant system.

6. The aqueous liquid detergent composition of claim 1 wherein the surfactant system comprises between 2% and 20% by weight of the surfactant system, of nonionic surfactant.

7. The aqueous liquid detergent composition of claim 1 wherein the composition further comprises from about 0.01% to about 10.0%, by weight of the composition, of a laundry adjunct selected from the group consisting of enzymes, enzymes stabilizers, optical brighteners, particulate material, hydrotropes, perfume, soil suspending polymers and/or soil release polymers, fabric care benefits, pH adjusting agents, dye transfer inhibiting agents, preservatives, hueing dyes, non-fabric substantive dyes, encapsulated actives, and mixtures thereof.

8. The aqueous liquid detergent composition of claim 1 wherein the composition further comprises perfume microcapsules, a hueing dye, or a mixture thereof.

9. The aqueous liquid detergent composition of claim 1, wherein the alkyl portion of the alkyl ethoxylated sulfate surfactant includes, on average, from 13.7 to about 16 carbon atoms distribution.

10. The aqueous liquid detergent composition of claim 9, wherein the alkyl portion of the alkyl ethoxylated sulfate surfactant includes, on average, from 13.9 to about 14.6 carbon atoms distribution.

11. The aqueous liquid detergent composition of claim 1, further comprising from about 1.0% to about 2.5% of citric acid, by weight of the composition.

12. The aqueous liquid detergent composition of claim 1, wherein the surfactant system comprises less than 1% by weight of the composition of anionic mid-chain branched surfactants.

13. The aqueous liquid composition of claim 1, further comprising a soap.

14. The aqueous liquid composition of claim 1, wherein the anti-foam further comprises a water-insoluble organic compound.

* * * * *